United States Patent Office 3,269,176
Patented August 30, 1966

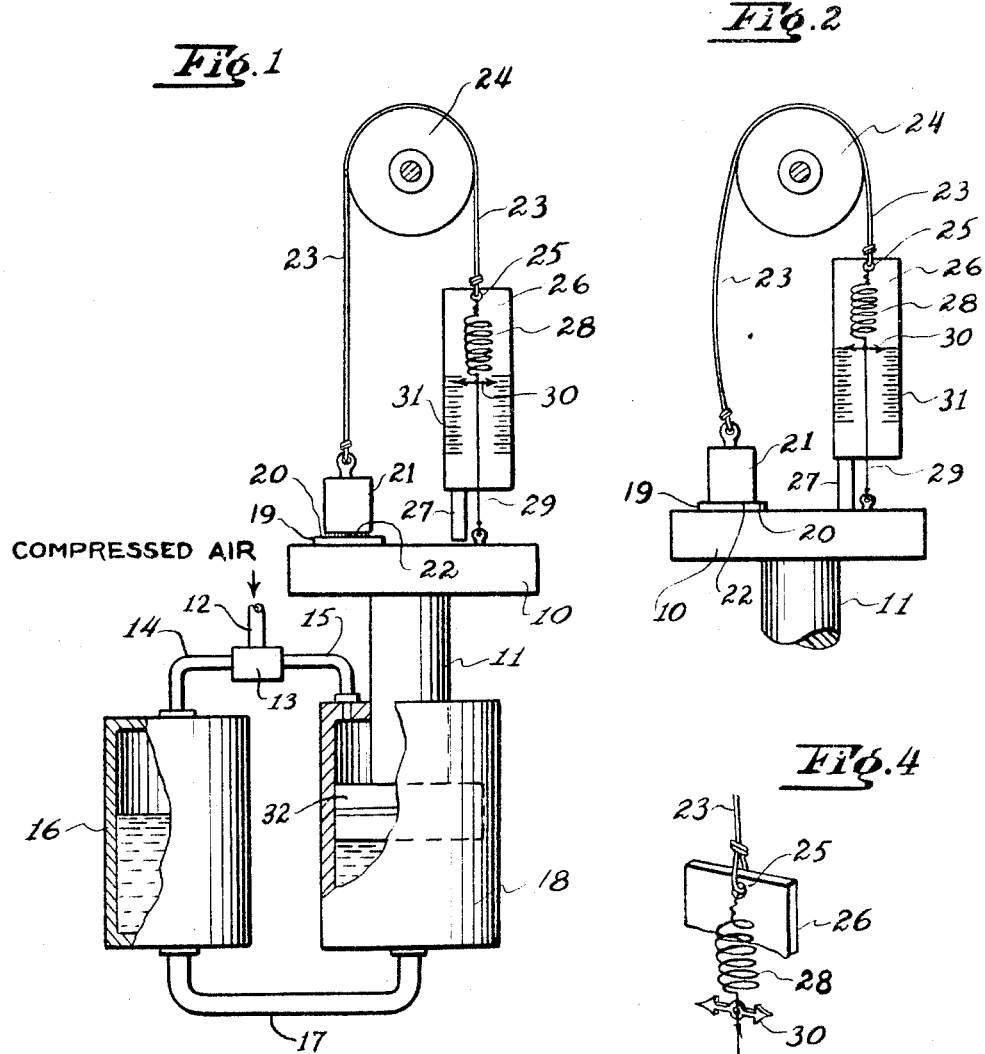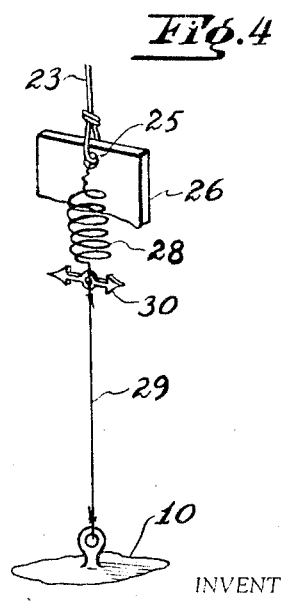
INVENTORS
JOHN L. EGITTO
BY JOHN A. MASCARO
J. B. Kraft
F. W. Wyman
ATTORNEYS

3,269,176
APPARATUS FOR MEASURING THE TACK OF COATED SURFACES
John L. Egitto, Belleville, N.J., and John A. Mascaro, Bronx, N.Y., assignors to Interchemical Corporation, New York, N.Y., a corporation of Ohio
Filed July 16, 1963, Ser. No. 295,308
5 Claims. (Cl. 73—150)

This invention relates to apparatus for measuring tack, particularly the tack of coated surfaces.

Coatings of film-forming resinous materials are being used extensively for many purposes. In most areas where these coatings are used as protective coatings or top coatings, even slight tackiness is undesirable e.g., in upholstery, clothing or furniture. Often coatings which are not initially noticeably tacky develop a tackiness upon being subjected to conditions such as weathering, moisture, heat or ultraviolet light, and, of course, the coating industry is continuously trying to eliminate such undesirable tack whenever it appears.

However, it appears that experimentation with and formulation of coating compositions which eliminate or substantially reduce low tackiness has been hampered by the absence of apparatus which can accurately measure and compare tackiness and differences in tackiness in coated surfaces having low tack. Existing tack measuring apparatus fall into two categories:

(1) Apparatus for measuring the tack of adhesives. These apparatus which depend on point contact with a surface carrying the adhesive or line contact (e.g. the tangential contact of a cylinder) with the surface carrying the adhesive. Such adhesive tack measuring apparatus are only sensitive to differences in tack of a much greater order than the tack encountered in surfaces coated with film-forming resins described above;

(2) Apparatus for measuring the tack of inks have also been found to be inadequate for measuring the tack of resinous top coatings which are plastic solids.

We developed the apparatus of this invention to provide means for measuring small differences in tack of coated surfaces of low tackiness. The apparatus was developed to meet our need for an instrument to measure the low tack of fabrics coated with vinyl resins. Accordingly, while we may set forth the background of this invention with respects to vinyl resin coatings, it should be clear that the apparatus will operate equally well with other coated surfaces.

Vinyl resins, that is resins comprising polymers and copolymers of polyvinyl chloride, are extensively used in top coatings for coated fabrics used in upholstery. While these coatings initially have substantially no tack, upon exposure to ultraviolet light or sunlight, these coatings develop a slight undesirable tack. In order to eliminate or substantially reduce the tack of these materials, we became involved in experimentation in which the conditions of producing the vinyl coatings as well as the constituents in the coating were varied in order to determine the effect of such changes in the tack of the coatings after accelerated exposure of said coatings to ultraviolet light. However, because existing apparatus was not sensitive enough to indicate minor variations in tack or low tack coatings, we had no means of determining whether by varying a particular constituent or condition we were proceeding in the right direction towards the elimination of tack.

The apparatus of this invention solved our problem by being capable of recording small changes in tack that were even unperceptible to the touch.

Briefly described, the apparatus of this invention for measuring tack of a coated surface comprises a level vertically movable platform, means for vertically moving said platform, means for mounting said coated surface flat upon said platform, a weight having a flat surface resting flush upon the coated surface, tackle means attached to said first weight having a counterbalancing weight equivalent to the first weight, said tackle means being initially inactive but being activatable as the platform is lowered past a preselected level at which point said first weight becomes fully counterbalanced and spring balance means for acting upon said plastic coated surface, said spring balance being initially inactive but being activatable at the level where said initial weight is counterbalanced to resist the downward movement of the coated surface.

The invention may be better understood by reference to the drawings in which:

FIG. 1 is a diagram of one embodiment of the apparatus in its activated phase,

FIG. 2 is a diagram of the apparatus of FIG. 1 in its initial upper phase prior to activation and FIG. 3 is a diagram of the grooved surface in one embodiment of the weight which is applied to the coated fabric.

FIG. 4 is a detailed diagram showing the connections of the balance frame and spring.

Referring now to FIGS. 1, 2 and 4, level platform 10 is supported on piston rod 11. A hydraulic means for raising and lowering piston rod 11 consists of a compressed air source (not shown) which drives compressed air through conduit 12 through compressed air direction control means 13 which directs air either into conduit 15 for lowering the platform or conduit 14 for raising the platform. Conduit 14 leads into oil reservoir 16, and the entering compressed air forces the oil through conduit 17 into piston bearing cylinder 18 wherein the entering oil acts upon the piston 32 to push piston rod 11 and platform 10 upwards. To lower the platform, compressed air is directed through conduit 15 into the top of piston bearing cylinder 18 wherein the entering air forces the oil and piston downward. A specimen of material 19 having the coated surface 20 to be tested is fixed to platform 10. Initially when the platform is in its starting upper position (see FIG. 2) cylindrical weight rests upon surface 20 with gravity urging surface 22 of weight 21 against surface 20. Weight 21 is connected to one end of line 23 passing over pulley 24 which is mounted at a fixed position above platform 10, line 23 and pulley being operatively associated to form a single tackle. The other end of line 23 is attached to spring balance frame 26 at junction 25. Frame 26 has a weight equivalent to that of weight 21. In the upper initial position, the weight of frame 26 rests upon platform 10 supported by leg 27 and connecting line 23 is slack. Also connected to line 23 at junction 25 is one end of longitudinally expandable spring 28, the other end of spring 28 being attached to the platform by line 29. Just below the lower end of spring 28 is indicator 30, the distance of which from platform 10 will remain fixed by the length of line 29 irrespective of the movement of platform 10. Frame 26 which, as will be hereinafter set forth in greater detail, rides up and down past indicator 30 is marked with scale 31 which indicates the longitudinal movement of frame 26 with respect to the lower end of spring 28. Since the upper end of spring 28, being fixed along with frame 26 to junction 25, must move the same distance longitudinally as does frame 26, the longitudinal movement of the frame with respect to the fixed lower end of the spring will be equal to the longitudinal expansion of the spring.

In a cycle of operation, initially the platform is in an upper position as shown in FIG. 2. Line 23 is slack; the full weight of weight 21 rests upon coated surface 20 and the full weight of frame 26 rests upon the platform. Then the platform is lowered and weight 21 and frame 26 descend carried by the platform until the point where the slack in line 23 is completely taken up. At this point the weight of frame 26 lifts from the platform and is applied to the end of line 23 as frame 26 hangs free counterbalancing the weight of weight 21, the gravitational force of which is removed from coated surface 20. After this point, surface 22 of weight 21 and coated surface 20 are held together only by the tack of coated surface 20. FIG. 1 shows the apparatus just at the point where the frame hanging free counterbalances weight 21. Any further downward movement of the platform acts upon the spring from two directions to expand the spring.

The downward movement of the platform acts upon line 23 through the tack between surfaces 20 and 22 over pulley 24 to draw the upper end of spring 28 upward and through line 29 to draw the lower end of spring 28 downward. Since frame 26 is drawn upward by line 23, the extent of the linear expansion of spring 28 is indicated by the movement of frame 26 with respect to indicator 30. The tension of the spring or the force urging the spring back to its original length is applied across the interface between coated surface 20 and surface 22 in opposition to the tack holding these two surfaces together. When the platform is lowered to the point where the tension of the spring exceeds the force of the tack holding surfaces 20 and 22 together, the bond will break and weight 21 will be lifted away from surface 20. The highest reading on scale 31 just prior to this break will represent the tack of the coated surface. Scale may be calibrated in any convenient method, e.g., the coated surfaces tested may be compared to a reference standard coated surface.

It has been found that best results are achieved when the surface of the weight which is brought into contact with the coated surface has a plurality of grooves. The grooves substantially eliminate the trapping of air in the interface between the two surfaces and reduce the effect of surface tension between the two surfaces. One preferable embodiment of a grooved surface is the cross-hatched arrangement of grooves as shown in FIG. 3. It is preferable that the grooves be of such proportions and distribution that at least a major portion of the flat surface remains ungrooved.

While there have been described what are at present considered to be the preferred embodiments of this invention, it will be obvious to one skilled in the art that various changes and modifications may be made therein without departing from the invention, and it is, therefore, aimed to cover all such changes and modifications as fall within the true spirit and scope of the invention.

What is claimed is:

1. Apparatus for measuring the tack of a coated surface comprising a level vertically movable platform, means for vertically moving said platform, means for mounting said surface flat upon said platform, a weight having a flat surface resting flush upon the coated surface, tackle means attached to said first weight having a counterbalancing weight equivalent to said first weight, said tackle means being initially inactive, but being activatable as the platform is lowered past a preselected level at which point said first weight becomes fully counterbalanced and spring balance means connected to said surface and to said weights and tackle means for acting upon said coated surface, said spring balance being initially inactive but being activatable at the level where said initial weight is counterbalanced to resist the downward movement of the coated surface.

2. Apparatus for measuring the tack of a coated surface comprising a level vertically movable platform, means for vertically moving said platform, means for mounting said surface flat upon said platform, a weight having a flat surface with a plurality of grooves in said surface, said flat surface resting flush upon the coated surface, single tackle means attached to said first weight having a counterbalancing weight equivalent to said first weight, said tackle means being initially inactive, but being activatable as the platform is lowered past a preselected level at which point said first weight becomes fully counterbalanced and spring balance means connected to said surface and to said weights and tackle means for acting upon said coated surface, said spring balance being initially inactive but being activatable at the level where said initial weight is counterbalanced to resist the downward movement of the coated surface.

3. Apparatus for measuring the tack of a coated surface comprising a level vertically movable platform, means for vertically moving said platform, means for mounting said surface flat upon said platform, a weight having a flat surface resting flush upon the coated surface, single tackle means comprising a pulley mounted above said weight and a line operatively associated with said pulley connecting said weight with the upper end of a spring balance having an adjusted weight equivalent to said first weight, the lower end of said spring balance being attached to said platform, said movable platform having an initial upper position wherein said tackle means are inactive, said line is slack, the full weight of said first weight rests upon the coated surface and the full weight of the spring balance rests upon the platform, said movable platform being lowerable past a preselected level at which the slack in said line is fully taken up and the weight of the spring balance is brought into counterbalancing relationship with said first weight from the coated surface, the surface of said first weight now being held in contact with the coated surface only by the tack of said coated surface and said platform being further lowerable beyond said preselected level, the spring in said spring balance being expanded by the combined upward pull of the line connected to the upper end of the spring balance and the pull on the lower end of said spring balance by the lowering platform, until the surface of said first weight separates from said coated surface, the amount of expansion of said spring just prior to said separation being directly proportional to the tack of the coated surface.

4. The apparatus of claim 3 wherein the flat surface of said first weight has a plurality of grooves.

5. The apparatus of claim 1 wherein the means for vertically moving said platform are hydraulic lifting means.

References Cited by the Examiner

UNITED STATES PATENTS

| | | | |
|---|---|---|---|
| 2,775,888 | 1/1957 | Pickup | 73—150 |
| 2,894,388 | 7/1959 | Cook et al. | 73—150 X |
| 3,129,586 | 4/1964 | Allen et al. | 73—150 X |

FOREIGN PATENTS

| | | |
|---|---|---|
| 39,246 | 5/1887 | Germany. |

DAVID SCHONBERG, *Primary Examiner.*